United States Patent Office 2,921,929
Patented Jan. 19, 1960

2,921,929

POLYEPOXIDE COMPOSITIONS

Benjamin Phillips and Paul S. Starcher, Charleston, and Charles W. McGary, Jr., and Charles T. Patrick, Jr., South Charleston, W. Va., assignors to Union Carbide Corporation, a corporation of New York No Drawing. Application December 20, 1956
Serial No. 629,472

18 Claims. (Cl. 260—78.4)

This invention relates to polyepoxide compositions and, more particularly, to polymerizable compositions and resins made therefrom. It is directed to polymerizable compositions comprising bis(2,3-epoxycyclopentyl) ether and polycarboxylic acid anhydrides and resins formed therefrom.

Our polymerizable compositions are low-viscosity, homogeneous liquids at room temperatures or at higher temperatures. These compositions can be easily handled in such resin-forming operations as coating, laminating, bonding, molding, casting, potting, calendering and the like. They are capable of accepting solid materials, such as fillers and pigments, for providing various effects in physical properties and coloration. With or without such added solid materials, they can be made to fill small intricacies of molds without the necessity of applying high pressures or heating to high temperatures, although such measures can be employed, if desired. Our compositions also can be easily spread, brushed, or sprayed by many techniques available in the paint, lacquer, and varnish industries for making coatings and finishes. Little, if any shrinkage occurs in curing to the resin. Our polymerizable compositions are capable of being accurately shaped by molds having intricate molding surfaces and cured to resins carrying exact details of such molding surfaces. They can be also advantageously employed in the potting of such fragile articles as electronic parts.

Our resins are transparent, water-resistant solids. They can be made as hard, rigid, thermoset products which are insoluble in most organic solvents. These resins can be machined to desired shapes and configurations and can be polished to provide appealing finishes. They can be made into articles having advantageous physical properties at high temperatures. Such articles have been found to have capabilities of sustaining high loads at high temperatures and to have heat distortion points in the 175° C. to 200° C. range and higher. In accordance with our invention, resins having a combination of any or all of these useful properties can be produced.

Our polymerizable compositions can be advantageously made by mixing bis(2,3-epoxycyclopentyl) ether with a polycarboxylic acid anhydride. Bis(2,3-epoxycyclopentyl) ether is a liquid having a viscosity of about 28 centipoises at about 27° C. Homogeneous compositions with solid polycarboxylic acid anhydrides can be obtained by heating the anhydride to at least its melting point and adding it to the ether, or by heating both the ether and anhydride to at least the melting point of the anhydride. Stirring aids the formation of a homogeneous composition. Acidic and basic catalysts in amounts ranging up to 5.0 weight percent based on the weight of bis(2,3-epoxycyclopentyl) ether can be added at this point, at any time prior to curing, or not at all, as desired. Higher catalyst concentrations above this range are also effective, although concentrations of 5.0 weight percent and below have been found to be adequate. Catalyst concentrations of 0.001 to 5.0 weight percent based on the weight of bis(2,3-epoxycyclopentyl) ether are particularly preferred.

This composition then can be cooled to room temperatures and stored for future use, if desired, or used immediately. Our polymerizable compositions can also contain polycarboxylic acids which can be used to modify properties of resins produced from such compositions. Polycarboxylic acids are preferably added with the polycarboxylic acid anhydrides to bis (2,3-epoxycyclopentyl) ether, or they can be added prior or subsequent to the addition of said anhydride. Homogeneous compositions may be obtained in the manner already described or in any other suitable manner. Other polyfunctional materials also may be incorporated into our polymerizable compositions. Such polyfunctional materials include polyhydric phenols, other polyepoxides, e.g., polyglycidyl ethers of polyhydric phenols and the like, low molecular weight urea-formaldehyde or phenol-formaldehyde polymers and the like. Many variations in the physical properties of our resins can be obtained by employing such other polyfunctional materials in our polymerizable compositions.

The curing can be carried out by maintaining the polymerizable compositions at temperatures from 50° C. to 250° C. Temperatures higher than 250° C. can be used, although some discoloration which may not be desired in the resin may result. The time for effecting a complete cure can be from several minutes to several hours. A high curing temperature provides resins in less time than a low curing temperature. The presence of a catalyst will also shorten the curing time. It is preferred to heat the polymerizable composition at a temperature within the range of 50° C. to 150° C. to first effect a partial cure. A temperature from 100° C. to 200° C. then can be used to complete the cure. However, any one or combination of two or more temperatures within the above-specified range of 50° C. to 250° C. can be employed, if desired, to effect the complete cure.

While not wishing to be held to any particular theory or mechanics of reaction, it is believed that in curing, one epoxy group of a bis(2,3-epoxycyclopentyl) ether molecule can be difunctional when reacted with polycarboxylic acid anhydrides, such that, the equivalent of two carboxy groups of the anhydride reacts with a single epoxy group to form two ester linkages

interconnecting the epoxide molecule with the anhydride molecules. This reaction can be typified by the general equation:

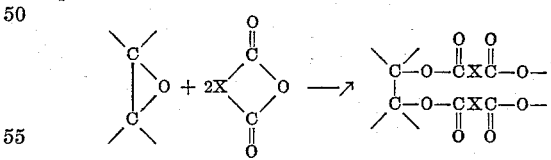

wherein

represents a polycarboxylic acid anhydride. This reaction of polycarboxylic acid anhydrides with bis(2,3-epoxycyclopentyl) ether is believed to provide cross-linking. It is also believed that resins obtained by using dicarboxylic anhydrides having fewer atoms in the shortest chain between the carbonyl groups of the oxydicarbonyl group are more rigid than those made with dicarboxylic anhydrides having more atoms in said shortest chain. Some degree of cross-linking is believed to be brought about by etherification of epoxy groups of different bis(2,3-epoxycyclopentyl) ether molecules during curing, such as may be represented by the equation:

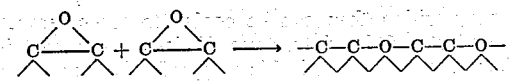

Similarly, it is believed that during curing, one epoxy group can be monofunctional when reacted with polycarboxylic acids, such that, one carboxy group of the acid reacts with a single epoxy group to form an ester linkage, i.e.

interconnecting the acid molecule with the epoxide molecule and a hydroxyl group attached to said epoxide molecule. This reaction can be represented by the equation:

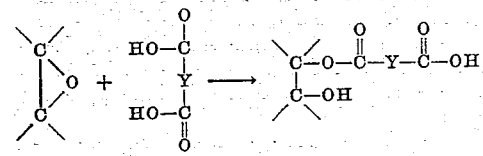

wherein

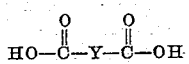

represents a polycarboxylic acid. A hydroxyl group such as that formed by this reaction and which is attached to the epoxide molecule is believed to be capable of reacting with an epoxy group, a carboxy group or an oxydicarbonyl group of a polycarboxylic acid anhydride to bring about cross-linking. By the use of polycarboxylic acids in our compositions, rigid resins, flexible resins or resins having intermediate degrees of flexibility or rigidty can be made, as desired. It is believed that compositions containing polycarboxylic acids tend to form more flexible resins than those not containing such polycarboxylic acids. Also, those compositions which contain polycarboxylic acids having a larger number of carboxy groups to the molecule form resins which tend to be more rigid than resins formed from compositions which contain polycarboxylic acids having fewer carboxy groups to the molecule. Resins obtained from compositions which contain dicarboxylic acids having greater numbers of atoms in the shortest chain connecting the carboxy groups have been found to have a greater degree of flexibility than resins made from compositions containing dicarboxylic acids having fewer atoms in the shortest chain connecting the carboxy groups. It is possible, therefore, to produce resins of different degrees of flexibility and rigidity to suit a large variety of particular needs.

Our resins can be made as thermoset products which are water-resistant and insoluble in many organic solvents. As an illustration, these thermoset resins can be made from compositions containing bis(2,3-epoxycyclopentyl) ether, polycarboxylic acid anhydrides in amounts having $x$ carboxy equivalents for each epoxy equivalent, and polycarboxylic acids in amounts having $y$ carboxy equivalents for each epoxy equivalent, wherein, $x$ is a number from 0.3 to 3.0, $y$ is a number from 0.0 to 1.0, the sum of $x$ and $y$ is not greater than 3.0 and the ratio of $x/y$ is at least equal to one. By the term "carboxy equivalent," as used herein, with regard to polycarboxylic acid anhydrides, is meant the number of moles of carboxy groups, —COOH, which would be contained by an amount of the hydrated anhydride, e.g., one mole of phthalic anhydride is considered to have 2 carboxy equivalents. When applied to polycarboxylic acids, the term "carboxy equivalent," as used herein, is meant to indicate the number of moles of carboxy groups, —COOH, contained by an amount of polycarboxylic acid, for example, one mole of a dicarboxylic acid contains 2 carboxy equivalents. By the term, "epoxy equivalent," as used herein, is meant the number of moles of epoxy groups

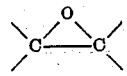

contained by an amount of bis(2,3-epoxycyclopentyl) ether. In determining the value of $x/y$ in the case where the denominator, $y$, may be zero, the quotient of $x/y$, as used herein, is taken to be equal to infinity or a number greater than one.

Hard, thermoset resins having high heat distortion values also can be obtained by curing our polymerizable compositions. Illustratively, our polymerizable compositions can be made from bis(2,3-epoxycyclopentyl) ether, polycarboxylic acid anhydrides in amounts containing $x$ carboxy equivalents for each epoxy equivalent, and polycarboxylic acids in amounts containing $y$ carboxy equivalents for each epoxy equivalent, wherein $x$ is a number from 0.5 to 2.0, $y$ is a number from 0.0 to 1.0, the sum of $x$ and $y$ is not greater than 2.0 and the ratio of $x/y$ is at least equal to one. These polymerizable compositions can be cured to hard, thermoset resins having high heat distortion values.

Our resins can be characterized as having recurring interconnected units represented by the following formula:

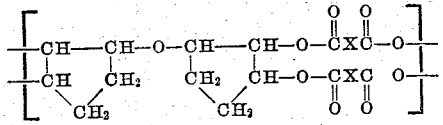

wherein, X represents a polycarboxylic acid anhydride residue. By the term, "polycarboxylic acid anhydride residue," as used herein, is meant a polyvalent group which can be regarded as the residue of a polycarboxylic acid anhydride molecule to which one, or more than one, oxidicarbonyl group of the formula

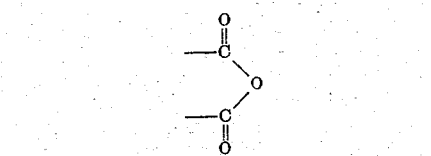

is attached to constitute said polycarboxylic acid anhydride molecule. Thus, a dicarboxylic acid anhydride molecule consists of the divalent group of the dicarboxylic acid anhydride residue to which one oxydicarbonyl group, as shown above, is attached.

Bis (2,3-epoxycyclopentyl) ether is a liquid diepoxy dicyclic aliphatic ether having a viscosity of about 28 centipoises at 27° C. The preparation of this diepoxide involves what can be termed epoxidation, or the controlled oxidation of the double bonds of bis(2-cyclopentenyl) ether which, itself, can be made from cyclopentadiene by the successive steps of hydrochlorination and alkaline hydrolysis. More specifically, bis(2-cyclopentenyl) ether can be prepared from the reaction of cyclopentadiene with hydrogen chloride in a suitable solvent, e.g., benzene, or without a solvent, for a period of about one hour at a low temperature, such as 0° C. to −15° C., thereby forming 1-chloro-2-cyclopentene. Subsequently, 1-chloro-2-cyclopentene can be subjected to alkaline hydrolysis with an aqueous solution of sodium carbonate or sodium hydroxide at a temperature of the order of 40° C. to 60° C. to form bis(2-cyclopentenyl) ether. A substantially pure bis(2-cyclopentenyl) ether then can be obtained by any suitable separation procedure, for example, fractional distillation.

Suitable epoxidizing agents for the epoxidation reaction include peracetic acid and acetaldehyde monoperacetate. The epoxidation reaction can be advantageously carried out by charging bis(2-cyclopentenyl) ether to a reaction vessel and then gradually adding the epoxidizing agent. In order to provide ease of handling and to avoid the formation of highly concentrated or crystalline peracetic acid with its attendant explosion hazard, the epoxidizing agent preferably is employed in a solvent, as for example, acetone, chloroform, methylethyl ketone, ethyl acetate, butyl acetate, and the like. The reaction can be carried out at a temperature within the range of about −25° C. to 150° C., although lower and higher temperatures may be used. However, longer reaction times are needed at the lower temperatures to produce high yields. At the higher temperatures, side reactions form undesirable materials which can be removed, however, by conventional purification procedure, such as, fractional distillation. The reaction is continued until an analysis for epoxidizing agent indicates that an amount at least sufficient to epoxidize all the double bonds of the bis(2-cyclopentenyl) ether has been consumed. In this connection it is desirable to employ an excess over the theoretical amount of peracetic acid to assure complete epoxidation. Upon discontinuance of the reaction, side-reaction products, solvent and unreacted material are removed by any convenient procedure, such as, by adding a potboiler, e.g., ethylbenzene, and stripping low-boiling materials. A liquid material, identified as bis(2,3-epoxycyclopentyl) ether, is obtained. This product partially solidifies on standing at room temperature for 1 to 3 days which indicates the possible formation of a solid position isomer. This semi-solid bis(2,3-epoxycyclopentyl) ether can be liquefied by melting at a temperature of 30° C. to 35° C. and will remain a liquid for a period of several days at room temperatures.

Polycarboxylic acid anhydrides useful in producing our resins can be represented by the formula:

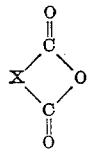

wherein X represents two or more carbon atoms interconnected by single or double bonds and to which such groups as hydrogen, alkyl, hydroxyl, nitro, chloro, iodo, bromo, cyclic groups and the like or combinations thereof may be attached. X can also represent groups containing carbon atoms interconnected by single or double bonds and oxydicarboxyl groups, i.e.

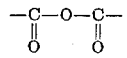

interconnecting the carbon atom groups to which such other groups as previously mentioned may be attached. X may also represent such cyclic groups as phenylene, cyclohexylene, cyclohexenylene, and the like which may have one or more oxydicarbonyl groups attached thereto. Polycarboxylic acid anhydrides, containing other groups not specifically mentioned herein, and not taking part in the curing reaction may be used in our polymerizable compositions without harmful effects, and, in fact, may be used to develop particular properties in our resins. One polycarboxylic acid anhydride or a mixture of two or more, as desired, can be used in our polymerizable compositions.

Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichloromaleic anhydride, itaconic anhydride, citraconic anhydride, hexahydrophthalic anhydride, hexachlorphthalic anhydride, tetrahydrophthalic anhydride, methyltetrahydrophthalic anhydride, tetrachlorphthalic anhydride; hexachloroendomethylenetetrahydrophthalic anhydride, hereinafter referred to as chlorendic anhydride, tetrabromophthalic anhydride, tetraiodidophthalic anhydride; phthalic anhydride, 4-nitrophthalic anhydride, 1,2-naphthalic anhydride, 1,8-naphthalic anhydride, 2,3-naphthalic anhydride; 1,2,4,5-benzenetetracarboxylic dianhydride; polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid, and the like. Also, other dicarboxylic acid anhydrides, useful in our polymerizable compositions, include the Diels-Alder adducts of maleic acid and aliphatic compounds having conjugated double bonds. Preferred polycarboxylic acid anhydrides are those which are soluble in bis(2,3-epoxycyclopentyl) ether at temperatures below about 250° C.

Polycarboxylic acids which can be used in our compositions are compounds containing two or more carboxy groups to the molecule. Typical polycarboxylic acids can be represented by the formula:

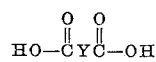

Y can represent a single bond or a divalent group composed of one carbon atom or groups of carbon atoms interconnected by single or multiple bonds, and to which such groups as hydrogen, alkyl, carboxy, chloro, bromo, amino, cyclic groups and the like or combinations thereof can be attached. Y can also represent a divalent group containing groups of carbon atoms interconnected by single or multiple bonds and ester linkages, i. e.,

or such other atoms as oxygen, sulfur or nitrogen atoms, interconnecting the carbon atom groups to which such other groups as previously mentioned may be attached. Y may represent cyclic groups, such as, phenylene, cyclohexylene, cyclohexenylene and the like. Polycarboxylic acids containing other groups not specifically mentioned herein and not participating in the curing reaction can be used in producing our polyesters and, in fact, can be particularly useful in developing special properties in our resins. Mixtures of polycarboxylic acids, or only one polycarboxylic acid, as desired, can be used in making our resins.

Representative polycarboxylic acids include oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allymalonic acid, muconic acid, alpha-hydromuconic acid, beta-hydromuconic acid, diglycolic acid, dilactic acid, dithioglycolic acid, 4-amyl-2,5-heptadienedioic acid, 3-hexynedioic acid, 4,6-decadiynedioic acid, 2,4,6,8-decatetraenedioic acid, 1,2-cyclohexanedicarboxylic acid, 1,4 - cyclohexanedicarboxylic acid, 2-carboxy-2-methylcyclohexaneacetic acid, phthalic acid, isophthalic acid, terephthalic acid, tetrahydrophthalic acid, tetrachlorphthalic acid, 1,8-naphthalenedicarboxylic acid, 3-carboxycinnamic acid, 1,2-naphthalenedicarboxylic acid, 1,1,5-pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4-benzenetricarboxylic acid, 1,3,5-benzenetricarboxylic acid, 3-hexene-2,2,3,4-tetracarboxylic acid, 1,2,3,4-benzenetetracarboxylic acid, 1,2,3,5-benzenetetracarboxylic acid, 1,2,4,5-benzenetetracarboxylic acid, benzenepentacarboxylic acid, benzenehexacarboxylic acid and the like.

Also as polycarboxylic acids useful in our polymerizable compositions are included compounds containing ester groups, two or more carboxy groups and which can be aptly termed polycarboxy polyesters of polycarboxylic acids, such as those listed above, or the corresponding anhydrides of said acids, with polyhydric alcohols. By the term "polycarboxy polyesters," as used herein, is meant polyesters containing two or more carboxy groups per molecule. These polycarboxy polyesters can be prepared by known condensation procedures, employing mole ratios favoring greater than equivalent amounts of polycarboxylic acid, or anhydride. More specifically, the amount of polycarboxylic acid, or anhydride, employed in the esterification reaction should contain more carboxy groups than are required to react with the hydroxyl groups of the amount of polyhydric reactant. Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, pentane-1,5-diol, pentane-2,4-diol, 2,2-dimethyltrimethylene glycol, hexane-1,4-diol, hexane-1,5-diol, hexane-1,6-diol, hexane-2,5-diol, 3-methylpentane-1,5-diol, 2-methylpentane-2,5-diol, 3-methylpentane-2,5-diol, 2,2-diethylpropane-1,3-diol, 2-ethylhexane-1,3-diol, 2,5-dimethylhexane-2,5-diol, octadecane-1,12-diol, 1-butene-3,4-diol, 2-butene-1,4-diol, 2-butyne-1,4-diol, 2,5-dimethyl-3-hexyne-2,5-diol, and the like; trihydric compounds such as glycerol, trimethyolmethane, hexane-1,2,6-triol, 1,1,1-trimethylolpropane, and the like; tetrahydric compounds, such as pentaerythritol, diglycerol, and the like; and higher polyhydric compounds such as pentaglycerol, dipentaerythritol, polyvinyl alcohols and the like. Additional polyhydric alcohols useful in making polycarboxy polyesters can be prepared by the reaction of epoxides, e.g., diglycidyl ethers of 2,2-propane bis-phenol, and reactive hydrogen-containing organic compounds, e.g., amines, polycarboxylic acids, polyhydric compounds and the like. In forming the polycarboxy polyesters that can be employed in the compositions of this invention it is preferable to use a dihydric, trihydric or tetrahydric aliphatic or oxa-aliphatic alcohol. The mole ratios in which the polycarboxylic acid or anhydride can be reacted with polyhydric alcohols in preparing polycarboxylic polyesters useful in our compositions are those which provide polyesters having more than one carboxy group per molecule. In the case of trifunctional and tetrafunctional reactants in the esterification reaction, the mole ratios of the respective reactants must be such as to avert gelation. The preferred mole ratio ranges of dicarboxylic acid to trihydric or tetrahydric alcohols that have been found to provide polycarboxylic polyesters which preferably can be used in the compositions of this invention are presented in Table I.

TABLE I

| Polyhydric Alcohol | Mole Ratio of Dicarboxylic Acid or Anhydride to Polyhydric Alcohols |
| --- | --- |
| Trihydric Alcohol | 2.2 to 3.0. |
| Tetrahydric Alcohol | 3.3 to 4.0. |

It is particularly preferred, however, to employ polycarboxylic polyesters prepared from dicarboxylic acids or anhydrides and polyhydric alcohols in the mole ratios specified in Table II.

TABLE II

| Polyhydric Alcohol | Mole Ratio of Dicarboxylic Acid or Anhydride to Polyhydric Alcohols |
| --- | --- |
| Trihydric Alcohol | 2.5 to 3.0. |
| Tetrahydric Alcohol | 3.5 to 4.0. |

These polycarboxy polyesters can be obtained by condensing, in accordance with known procedures, a polyhydric alcohol and a polycarboxylic acid or anhydride. This condensation reaction may be conducted, for example, by heating the reactants to a temperature within the range from 100° C. to 200° C. with or without an acidic catalyst. Water formed by the condensation reaction may be removed by distillation. The course of the reaction may be followed by making acid number determinations and the reaction can be stopped when a suitable polycarboxy polyester has been obtained.

Catalysts which can be employed with advantageous effects in speeding the cure of our resins are the acidic catalysts including mineral acids and metal halide Lewis acids. Representative of mineral acids which can be used in speeding the formation of our resins are sulfuric acid, perchloric acid, polyphosphoric acid and the various sulfonic acids, such as, toluene sulfonic acid, benzene sulfonic acid and the like. Metal halide Lewis acids which are also effective in speeding the cure of our resins include boron trifluoride, stannic chloride, zinc chloride, aluminum chloride, ferric chloride and the like. The metal halide Lewis acid catalysts can also be used in the form of such complexes as etherate complexes and amine complexes, for example, boron trifluoride-piperidine and boron trifluoride-monoethylamine complexes. In the form of a complex, the metal halide Lewis acid catalyst is believed to remain substantially inactive until released as by dissociation of the complex upon increasing the temperature. When released from the complex, the catalyst then exerts its catalytic effect.

Uniform dispersion of catalyst in our polymerizable compositions prior to curing has been found to be desirable in order to obtain homogeneous resins and to minimize localized curing around catalyst particles. Agitation of the polymerizable compositions containing catalyst is adequate when the catalyst is miscible with said compositions. When the two are immiscible, the catalyst can be added in a solvent. Typical solvents for the catalysts include organic ethers, e.g., diethyl ether, dipropyl ether, 2-methoxy-1-propanol, organic esters, e.g., methyl acetate, ethyl acetate, ethylpropionate, organic ketones, e.g., acetone, methylisobutylketone, cyclohexanone, organic alcohols, e.g., methanol, cyclohexanol propylene glycol and the like. The mineral acids can be employed as solutions in water, whereas metal halide Lewis acid catalysts tend to decompose in water and aqueous solutions of such Lewis acids are not preferred.

Our polymerizable compositions can be used in coatings, castings, moldings, bondings, laminates and the like in the manufacture of articles having a multitude of uses. These compositions can be colored by pigments and very appealing appearances may be imparted to articles made therefrom. Fillers can also be incorporated in our compositions so as to impart special properties to articles manufactured therefrom. Such sundry articles as buttons, combs, brush handles, structural parts for instrument cabinets and the like can be formed through the use of our polymerizable compositions and resins. Of particular importance, are uses of our hard, tough resins of high heat distortion values in industrial applications wherein load carrying capabilities at high temperatures are required. Uses of this kind include hot fluid carrying conduits, high temperature tools and dies, minor structural parts and high temperature electrical insulation for high-speed aircraft and the like. Our polymerizable compositions are particularly useful in the manufacture of large tools, as for example, used in the automobile industries wherein the fluid nature of our compositions simplifies the construction of such tools. These compositions are particularly useful in the potting of electrical components wherein it may be desired to incorporate in the potting composition a heat conductive metal, such as, copper or aluminum.

The following examples are presented. Unless otherwise specified in the examples, room temperatures are temperatures in the range of 25° C. to 30° C.

*Examples 1 through 9*

Nine mixtures, each containing 0.92 gram of bis (2,3-epoxycyclopentyl) ether and amounts of phthalic anhydride appearing in Table I below were prepared. The ratio of carboxy equivalents to epoxy equivalents contained by each mixture is correspondingly listed in Table I. To each mixture 1 drop of 1 weight percent potassium hydroxide (in methanol) was added. The mixtures were heated until they became homogeneous (at a temperature below about 110° C.). These homogeneous mixtures at 110° C. had viscosities which were similar to the viscosity of water at room temperature. At room temperature these mixtures were uniform pasty masses. The temperature of each mixture was raised to 160° C. and maintained thereat until gels were formed with the exception of the mixture of Example I which did not form a gel. The times required to form gels at 160° C. are correspondingly listed in Table I. The gels formed from each mixture were then maintained at a temperature of 160° C. for a total of 11 hours including the time required to produce a gel. The mixture of Example I was maintained at 160° C. for a total of 11 hours. Thermoset resins were obtained from each gel and a thermoplastic, solid resin was obtained from the mixture of Example I after this period. The properties of these resins are correspondingly listed in Table I.

TABLE I

| Example Number | Weight of Phthalic Anhydride (Grams) | Carboxy Equivalent/ Epoxy Equivalent | Gel Time (Hours) | Resin Description |
|---|---|---|---|---|
| 1 | 0.22 | 0.29 | No gel | Thermoplastic solid. |
| 2 | 0.37 | 0.5 | 3.7 | Thermoset solid. |
| 3 | 0.56 | 0.75 | 3.6 | Thermoset, tough solid—Barcol hardness of 26. |
| 4 | 0.74 | 1.0 | 2.8 | Thermoset, solid—Barcol hardness of 36. |
| 5 | 0.93 | 1.25 | 3.3 | Thermoset, solid—Barcol hardness of 29. |
| 6 | 1.11 | 1.5 | 3.8 | Thermoset, solid—Barcol hardness of 39. |
| 7 | 1.48 | 2.0 | 3.6 | Thermoset, solid—Barcol hardness of 36. |
| 8 | 1.85 | 2.5 | 4.6 | Thermoset, tough, solid—Barcol hardness of 8. |
| 9 | 2.22 | 3.0 | 4.8 | Thermoset, solid. |

*Examples 10 through 16*

Seven mixtures, each containing 0.92 gram of bis (2,3-epoxycyclopentyl) ether and 0.74 gram of phthalic anhydride were prepared. Each mixture contained amounts of bis (2,3-epoxycyclopentyl) ether and phthalic anhydride which provided ratios of 1 carboxy equivalent for each epoxy equivalent. To each mixture amounts of various catalysts as listed in Table II below were added. The mixtures then were heated until they became homogeneous (at temperatures below about 110° C.). The viscosities of these mixtures were similar to the viscosity of water at room temperature. At room temperature the mixtures were uniform pasty masses. The mixtures were then brought to a temperature of 160° C. and maintained thereat until gels were formed. Each mixture formed a gel during the times listed in Table II.

TABLE II

| Example Number | Catalyst | Amount of Catalyst (Grams) | Weight Percent of Catalyst | Gel Time (Hours) |
|---|---|---|---|---|
| 10 | Potassium hydroxide (1 weight percent dissolved in methanol). | 0.08 | 0.05 | 0.75 |
| 11 | Dimethylbenzylamine | 0.0104 | 0.6 | 0.72 |
| 12 | Zinc chloride (4 weight percent dissolved in ethyl acetate). | 0.02 | 0.05 | 0.67 |
| 13 | Stannic chloride (2 weight percent dissolved in ethyl acetate). | 0.04 | 0.05 | 3.47 |
| 14 | Sulfuric acid (5 weight percent dissolved in ethyl ether). | 0.04 | 0.12 | 3.43 |
| 15 | Phosphoric acid (5 weight percent dissolved in ethyl ether). | 0.04 | 0.12 | 5.30 |
| 16 | Control (no catalyst) | 0.00 | 0.00 | 5.88 |

*Examples 17 through 20*

Four mixtures were prepared, each mixture contained 0.92 gram of bis(2,3-epoxycyclopentyl) ether and various amounts of anhydrides as listed in Table III below. The ratio of carboxy equivalent to epoxy equivalent contained by each mixture was 1:1. One drop of 1 weight percent potassium hydroxide (in methanol) was added to each of the mixtures of Examples 17, 18 and 19 and one drop of 12.5 weight percent of benzyldimethylamine in ethyl acetate was added to the mixture of Example 20. The mixtures were then heated until they became homogeneous, occurring at about 27° C. for Example 17, at about 50° C. for Example 18, below about 100° C. for Example 19 and below about 120° C. for Example 20. The viscosities of these mixtures at the above temperatures to which they were respectively brought to make them homogeneous were similar to the viscosity of water at room temperature. The mixtures of Examples 17 and 18 were thin liquids at room temperature and the mixture of Example 19 was a somewhat viscous liquid at room temperature. The mixture of Example 20 was a uniform pasty mass at room temperature. The homogeneous mixtures were then heated at 120° C. until gels were formed in the times correspondingly listed below. The gel of Example 20 was maintained at a 120° C. temperature for a total of 8 hours including the gel time. The gels of all examples were then maintained at a temperature of 160° C. for 6 hours during which time solid resins were formed. The resins thus obtained are described in Table III.

TABLE III

| Example Number | Anhydride | Weight of Anhydride | Gel Time (Hours) | Resin Description |
|---|---|---|---|---|
| 17 | Maleic | 0.49 | 0.95 | Thermoset—Barcol hardness of 40. |
| 18 | Polyadipic | 0.64 | 5.5 | Thermoset—Barcol hardness of 0. |
| 19 | Chlorendic | 1.82 | 0.21 | Thermoset—Barcol hardness 25. |
| 20 | Succinic | 0.5 | 3.33 | Thermoset—Barcol hardness of 23. |

*Example 21*

Three moles of bis(2,3-epoxycyclopentyl) ether, four moles of phthalic anhydride and 0.04 percent of alpha-methylbenzyldimethylamine catalyst based on the total weight of ether and anhydride were mixed. This mixture contained amounts of bis(2,3-epoxycyclopentyl) ether and phthalic anhydride which provided about 1.3 carboxy equivalents for each epoxy equivalent. A homogeneous mixture was obtained by heating to a temperature below about 110° C. and stirring. The viscosity of this mixture at about 110° C. was similar to that of water at room temperature. The homogeneous mixture at room temperature was a uniform pasty mass. The mixture so obtained was brought to a temperature of 150° C. and held at this temperature for 16 hours. A hard, tough, thermoset resin having a heat distortion of 176° C. was obtained. This resin was infusible and insoluble in most organic solvents.

*Example 22*

A mixture comprising 4.6 grams of bis(2,3-epoxycyclopentyl) ether, 4.4 grams of phthalic anhydride and 2.2 grams of adipic acid was prepared. The mixture contained amounts of bis(2,3-epoxycyclopentyl) ether, anhydride and acid which provided 1 carboxy equivalent of anhydride and 0.5 carboxy equivalent of acid for each epoxy equivalent of ether. This mixture was heated until it became homogeneous (at a temperature below about 110° C.). The viscosity of this mixture at 110° C. was similar to that of water at room temperature. The mixture at room temperature was a uniform pasty mass. The mixture was maintained at 160° C. A gel was formed in 54 minutes at this temperature and was kept at 160° C. for an additional 8.75 hours. There was obtained a tough, thermoset resin having a Barcol hardness of 31.

Barcol hardness values given in the foregoing examples were determined with a Barcol Impressor GYZJ 934-1. Heat distortion values and Izod impact values were obtained in accordance with ASTM methods D-648-45T and D-256-47T, respectively.

What is claimed is:

1. A polymerizable composition comprising bis(2,3-epoxycyclopentyl) ether, a polycarboxylic acid anhydride in an amount having $x$ carboxy equivalents for each epoxy equivalent of said composition and a polycarboxylic acid in an amount having $y$ carboxy equivalent for each epoxy equivalent of said composition; wherein $x$ is a number from 0.3 to 3.0, $y$ is a number from 0.0 to 1.0, the sum of $x$ and $y$ is not greater than 3.0 and $x/y$ is at least equal to one.

2. A polymerizable composition comprising bis(2,3-epoxycyclopentyl) ether, a polycarboxylic acid anhydride in an amount having $x$ carboxy equivalents for each epoxy equivalent of said composition and a polycarboxylic acid in an amount having $y$ carboxy equivalent for each epoxy equivalent of said composition; wherein $x$ is a number from 0.5 to 2.0, $y$ is a number from 0.0 to 1.0, the sum of $x$ and $y$ is not greater than 2.0 and $x/y$ is at least equal to one.

3. A polymerizable composition comprising bis(2,3-epoxycyclopentyl) ether, a dicarboxylic acid anhydride in an amount having $x$ carboxy equivalents for each epoxy equivalent of said composition and a dicarboxylic acid in an amount having $y$ carboxy equivalent for each epoxy equivalent of said composition; wherein $x$ is a number from 0.3 to 3.0, $y$ is a number from 0.0 to 1.0, the sum of $x$ and $y$ is not greater than 3.0 and $x/y$ is at least equal to one.

4. A polymerizable composition comprising bis(2,3-epoxycyclopentyl) ether and phthalic anhydride in an amount having from 0.3 to 3.0 carboxy equivalents for each epoxy equivalent of bis(2,3-epoxycyclopentyl) ether.

5. A polymerizable composition comprising bis(2,3-epoxycyclopentyl) ether and maleic anhydride in an amount having from 0.3 to 3.0 carboxy equivalents for each epoxy equivalent of bis(2,3-epoxycyclopentyl) ether.

6. A polymerizable composition comprising bis(2,3-epoxycyclopentyl) ether and polyadipic anhydride in an amount having from 0.3 to 3.0 carboxy equivalents for each epoxy equivalent of bis(2,3-epoxycyclopentyl) ether.

7. A polymerizable composition comprising bis(2,3-epoxycyclopentyl) ether and chlorendic anhydride in an amount having from 0.3 to 3.0 carboxy equivalents for each epoxy equivalent of bis(2,3-epoxycyclopentyl) ether.

8. A polymerizable composition comprising bis(2,3-epoxycyclopentyl) ether and succinic anhydride in an amount having from 0.3 to 3.0 carboxy equivalents for each epoxy equivalent of bis(2,3-epoxycyclopentyl) ether.

9. A polymerizable composition comprising bis(2,3-epoxycyclopentyl) ether, phthalic anhydride in an amount having $x$ carboxy equivalents for each epoxy equivalent of bis(2,3-epoxycyclopentyl) ether and adipic acid having $y$ carboxy equivalents for each epoxy equivalent of bis(2,3-epoxycyclopentyl) ether; wherein $x$ is a number from 0.3 to 3.0, $y$ is a number from 0.0 to 1.0, the sum of $x$ and $y$ is not greater than 3.0 and $x/y$ is at least equal to one.

10. The resinous polymer obtained by heating the polymerizable composition of claim 1.

11. The resinous polymer obtained by heating the polymerizable composition of claim 2.

12. The resinous polymer obtained by heating the polymerizable composition of claim 3.

13. The resinous polymer obtained by heating the polymerizable composition of claim 4.

14. The resinous polymer obtained by heating the polymerizable composition of claim 5.

15. The resinous polymer obtained by heating the polymerizable composition of claim 6.

16. The resinous polymer obtained by heating the polymerizable composition of claim 7.

17. The resinous polymer obtained by heating the polymerizable composition of claim 8.

18. The resinous polymer obtained by heating the polymerizable composition of claim 9.

References Cited in the file of this patent

UNITED STATES PATENTS

| 2,735,829 | Wiles et al. | Feb. 21, 1956 |
| 2,739,161 | Carlson | Mar. 20, 1956 |
| 2,744,845 | Rudoff | May 8, 1956 |

FOREIGN PATENTS

| 133,819 | Australia | July 14, 1946 |

UNITED STATES PATENT OFFICE
CERTIFICATE OF CORRECTION

Patent No. 2,921,929            January 19, 1960

Benjamin Phillips et al.

It is hereby certified that error appears in the printed specification of the above numbered patent requiring correction and that the said Letters Patent should read as corrected below.

Column 3, lines 19 to 22, for that portion of the formula reading

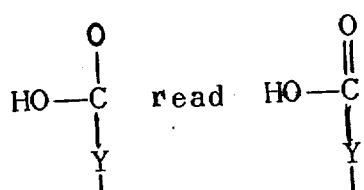

column 6, line 6, for "iodidophthalic" read -- iodophthalic --; line 59, for "allymalonic" read -- allylmalonic --.

Signed and sealed this 12th day of July 1960.

(SEAL)
Attest:

KARL H. AXLINE
Attesting Officer

ROBERT C. WATSON
Commissioner of Patents